UNITED STATES PATENT OFFICE.

FRIEDRICH FISCHER, OF BARMEN, ASSIGNOR TO FARBENFABRIKEN, VORMALS FRIEDR. BAYER & CO., OF ELBERFELD, GERMANY.

MANUFACTURE OF VIOLET DYE-STUFFS.

SPECIFICATION forming part of Letters Patent No. 325,827, dated September 8, 1885.

Application filed April 25, 1885. (Specimens.)

*To all whom it may concern:*

Be it known that I, FRIEDRICH FISCHER, of the city of Barmen, in the Empire of Germany, have invented a new and useful Improvement in Coloring-Matters, of which the following is a full, true, and accurate description.

My invention relates to a process for producing a new violet dye. The violet dye-stuff is formed by the action upon diethyl-aniline on perchlormethylmercaptan, which is the product of the reaction of chlorine upon carbon disulphide. In carrying out my process practically I proceed as follows: twenty parts perchlormethylmercaptan are slowly allowed to run in a mixture of forty-four parts diethyl-aniline and ten parts of calcium carbonate contained in a kettle provided with a stirrer standing in a water bath, the mixture being constantly stirred and externally cooled. The green pulpy mixture that forms is constantly stirred and gradually heated during twelve hours to between 100° and 110° centigrade by elevating the temperature of the water bath by means of superheated steam. The reaction is shown by the molten character assumed by the original green pulpy mixture. At the end of the period above named the whole mass presents a melt of coppery luster, which is brittle when cold, and contains the already-formed violet dye-stuff, which may be extracted by water. Purification and isolation of the dye-stuff may be effected in various ways. The whole melt is best dissolved in a small quantity of acidulated water filtered from resinous products decomposed by means of caustic soda solution to liberate the bases, and the diethyl-aniline which has not entered into the reaction is then expelled by means of steam. The resulting base is converted into either hydrochloric, sulphuric, or oxalic acid salt by known methods. The new violet coloring-matter that results is of excellent purity and brilliancy.

The dye-stuff thus obtained produces on the tissue a splendid fiery and pure violet color, which is bluer and purer than the color produced by the heretofore-known benzole-violet. This dye-stuff does not crystallize, but precipitates into violet flakes on the cooling of a concentrated water solution, or by the addition of common salt to a water solution of the coloring-matter the flakes melt when warm. On the addition of a strong acid to the water solution of a dye-stuff the color is first transformed into a green and then into a yellow. By the addition of an alkali to the acid solution of the dye-stuff a reversed sequence of the change of color is observed.

I do not in this application claim the product, intending to make a separate application therefor.

What I claim as my invention, and desire to secure by Letters Patent, is—

The process of producing a violet dye-stuff herein described, which consists in treating diethyl-aniline by perchlormethylmercaptan, substantially as described.

FRIEDRICH FISCHER.

Witnesses:
  GEO. H. EVANS,
  ANTHONY GREF.